US010293978B2

(12) United States Patent
Rossiter

(10) Patent No.: US 10,293,978 B2
(45) Date of Patent: May 21, 2019

(54) TANK ASSEMBLY WITH AT LEAST ONE COMPRESSIBLE MEMBER

(71) Applicant: GM GLOBAL TECHNOLOGY OPERATIONS LLC, Detroit, MI (US)

(72) Inventor: Jonathan P. Rossiter, Newcastle (CA)

(73) Assignee: GM Global Technology Operations LLC., Detroit, MI (US)

( * ) Notice: Subject to any disclaimer, the term of this patent is extended or adjusted under 35 U.S.C. 154(b) by 326 days.

(21) Appl. No.: 15/332,610

(22) Filed: Oct. 24, 2016

(65) Prior Publication Data

US 2018/0111718 A1 Apr. 26, 2018

(51) Int. Cl.

*B65D 25/02* (2006.01)
*B65D 25/38* (2006.01)
*G05B 15/02* (2006.01)
*G05D 9/12* (2006.01)
*B60K 15/03* (2006.01)

(52) U.S. Cl.

CPC ............ *B65D 25/02* (2013.01); *B65D 25/38* (2013.01); *G05B 15/02* (2013.01); *G05D 9/12* (2013.01); *B60K 15/03* (2013.01); *B60K 2015/0319* (2013.01)

(58) Field of Classification Search

CPC .................... B65D 25/02; B65D 25/38; B60K 2015/0319; B60K 15/03

See application file for complete search history.

(56) References Cited

U.S. PATENT DOCUMENTS 3,949,720 A 4/1976 Zipprich et al.

FOREIGN PATENT DOCUMENTS

DE 19805220 A1 8/1999

*Primary Examiner* — Anthony Ho
(74) *Attorney, Agent, or Firm* — Quinn IP Law

(57) ABSTRACT

A tank assembly includes a tank having a plurality of tank walls surrounding an interior cavity. The interior cavity is configured to store a fluid. The fluid is configured to expand upon a change in temperature. A fill channel and a vent channel are each in fluid communication with the interior cavity. At least one compressible member is positioned within the interior cavity and configured to provide an expansion space for the fluid. The compressible member eliminates the need to be concerned with a loss of air space when filling the tank with low flow rates and when filling on grades. The compressible member may be composed of a closed cell foam material. Alternatively, the compressible member may include a pouch having a hollow space surrounded by an outer skin.

20 Claims, 2 Drawing Sheets

TANK ASSEMBLY WITH AT LEAST ONE COMPRESSIBLE MEMBER

TECHNICAL FIELD

The disclosure relates generally to a tank assembly with at least one compressible member.

BACKGROUND

Some fluids expand on exposure to certain conditions, such as temperature. Due to this expansion, the tanks employed to store such fluids are sensitive to the quantity of fluid that is put in the tank. To accommodate the expansion of the fluid, a relatively large air space is generally left within the tank. This air space is sensitive to filling flow rates as well as the grade on which the tank is being filled.

SUMMARY

A tank assembly includes a tank having a plurality of tank walls surrounding an interior cavity. The interior cavity is configured to store a fluid. The fluid is configured to expand upon a change in temperature. A fill channel and a vent channel are each in fluid communication with the interior cavity. At least one compressible member is positioned within the interior cavity and configured to provide an expansion space for the fluid. Any number of compressible members may be employed. The compressible member enables a variable expansion space and removes the necessity of controlling the tank with air space.

The compressible member may be composed of a closed cell foam material. Alternatively, the compressible member may include a pouch having a hollow space surrounded by an outer skin. The hollow space may be filled with an inert gas. The outer skin is configured to be substantially impermeable by the fluid.

The tank may include a first end wall, a second end wall spaced from the first end wall and a plurality of sidewalls. The plurality of sidewalls are each contiguous with the first end wall and the second end wall. In one embodiment, the compressible member may be positioned in contact with the first end wall but not the second end wall. The fill channel and the vent channel may each pass through the at least one compressible member. The fill channel may be configured to allow passage of the fluid into the interior cavity. The fluid may selectively produce a vapor. The vent channel may be configured to allow passage of a vapor out of the interior cavity. The passage of the vapor may be controlled via a valve in the vent channel. The vapor may be displaced air that is being pushed out as the fluid is being filled. The vapor may also be due to evaporation of the fluid.

A first blocking member may be positioned in the interior cavity and operatively connected to the fill channel. A second blocking member may be positioned in the interior cavity and operatively connected to the vent channel. The first and second blocking members may be configured to prevent the compressible member from exiting the interior cavity. A porous enclosure may be rigidly operatively connected to at least one of the plurality of tank walls such that the porous enclosure encapsulates the at least one compressible member.

A sensor may be operatively connected to the tank and configured to obtain a position-sensitive temperature data of the fluid. An actuator may be operatively connected to and configured to selectively move the compressible member. A controller may be operatively connected to the sensor and the actuator, with the actuator being controllable by the controller. The controller has a processor and tangible, non-transitory memory on which is recorded instructions for executing a method of controlling a position of the compressible member. Execution of the instructions by the processor causes the controller to obtain the position-sensitive temperature data of the fluid. The position-sensitive temperature data may be obtained via the sensor.

The controller may be programmed to determine a location of a last freeze of the fluid, based at least partially on the position-sensitive temperature data. The sensor may include a plurality of probes configured to determine respective temperature gradients along an X, Y and Z axis, respectively. The location of last freeze may be selected as the hottest spot in the fluid. The controller may be programmed to position the compressible member at the location of the last freeze, via the actuator.

The assembly may include first and second compressible members. The controller may be configured to determine first and second locations of last freeze of the fluid based at least partially on the position-sensitive temperature data. First and second actuators may be operatively connected to and configured to selectively move the first and second compressible members, respectively. The controller may be specifically programmed to position the first and second compressible member at the first and second locations, respectively, via the first and second actuators. Where there are multiple compressible members, the controller may be programmed to determine multiple hot spots, one for each of the respective compressible members.

The above features and advantages and other features and advantages of the present disclosure are readily apparent from the following detailed description of the best modes for carrying out the disclosure when taken in connection with the accompanying drawings.

DETAILED DESCRIPTION

Figure 1:
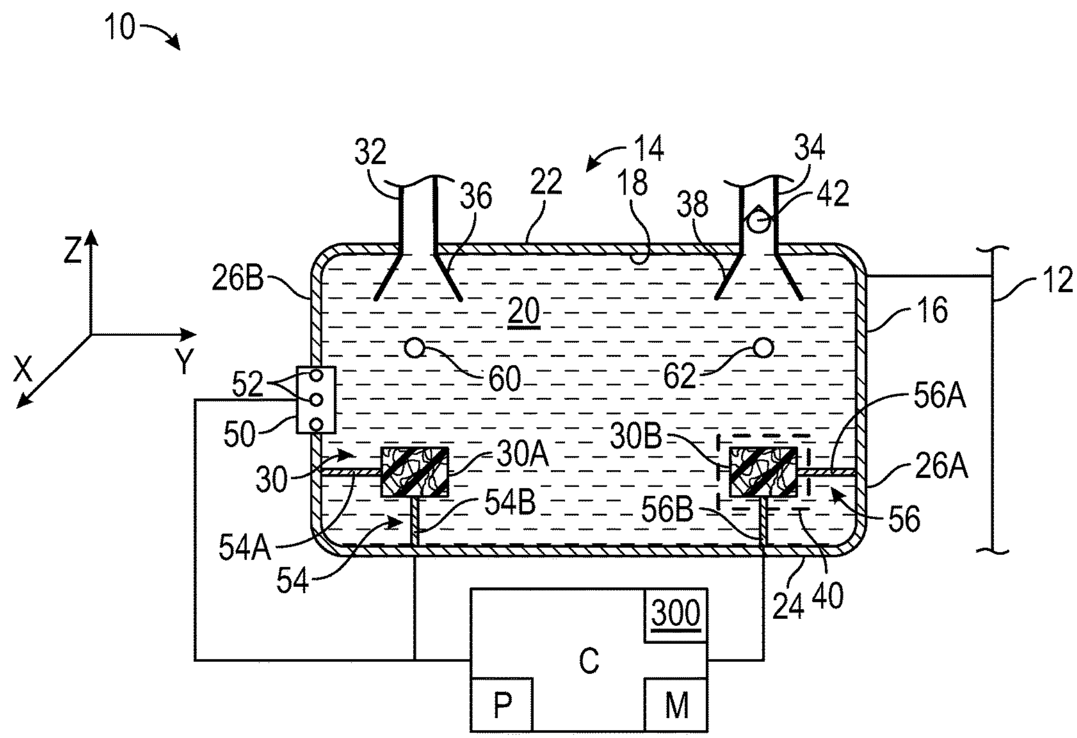
FIG. 1 is a schematic diagram of a tank assembly having at least one compressible member, in accordance with a first embodiment of the disclosure.
Figure 2:
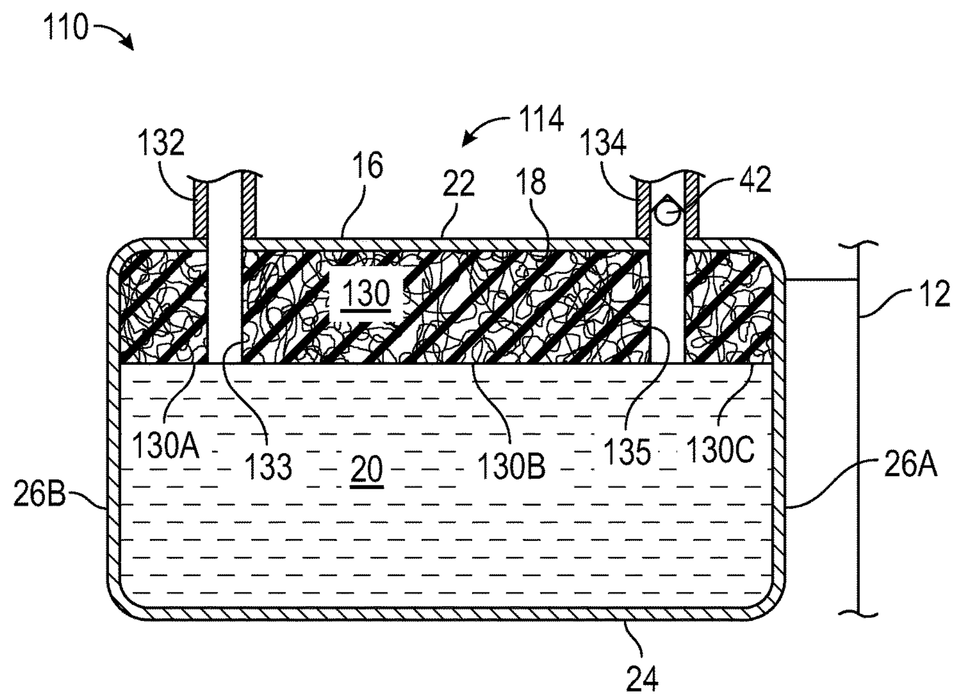
FIG. 2 is a schematic diagram of another tank assembly having at least one compressible member, in accordance with a second embodiment of the disclosure.

Referring to the drawings, wherein like reference numbers refer to like components, FIG. 1 schematically illustrates a tank assembly 10, in accordance with a first embodiment of the disclosure. FIG. 2 schematically illustrates a tank assembly 110, in accordance with a second embodiment of the disclosure. The assemblies 10, 110 may each be a component of a device 12. The device 12 may be a mobile platform, such as, but not limited to, a standard passenger car, sport utility vehicle, light truck, heavy duty vehicle, ATV, minivan, bus, transit vehicle, bicycle, robot, farm implement, sports-related equipment, boat, plane, train or any other transportation device. The device 12 may be a non-mobile platform. The device 12 may take many different forms and include multiple and/or alternate components and facilities.

Referring to FIGS. 1-2, the assemblies 10, 110 each include a tank 14 having a plurality of tank walls 16 surrounding an interior cavity 18. The interior cavity 18 is configured to store a fluid 20. The fluid 20 is configured to expand upon an external stimulus, such as for example, a change in temperature. Any fluid known to those skilled in the art may be employed. Referring to FIGS. 1-2, the plurality of tank walls 16 may include a first end wall 22, a second end wall 24 spaced from the first end wall 22 and a plurality of sidewalls, such as first and second sidewalls 26A, B. The first and second sidewalls 26A, B are each contiguous with the first end wall 22. The first and second sidewalls 26A, B are each contiguous with the second end wall 24.

Referring to FIG. 1, the assembly 10 includes at least one compressible member 30 positioned within the interior cavity 18 and configured to provide an expansion space for the fluid 20. The embodiment shown in FIG. 1 includes first and second compressible members 30A, 30B. However, it is to be understood that any number of compressible members may be employed.

Referring to FIG. 1, a fill channel 32 and a vent channel 34 are each in fluid communication with the interior cavity 18. Any number of fill and vent channels may be employed. A first blocking member 36 may be positioned in the interior cavity 18 and operatively connected to the fill channel 32. A second blocking member 38 may be positioned in the interior cavity 18 and operatively connected to the vent channel 34. The first and second blocking members 36, 38 are configured to prevent the first and second compressible members 30A, 30B, respectively, from exiting the interior cavity 18. For example, the first blocking member 36 may be shaped as a structure with an entryway that is less than a maximum dimension (length or width) of the first compressible member 30A. The first and second blocking members 36, 38 are configured to prevent the first and second compressible members 30A, 30B, respectively, from plugging and restricting the opening of the vent channel 34.

Referring to FIG. 1, the first and second compressible members 30A, 30B may be held in place or tethered via various enclosures. For example, referring to FIG. 1, a porous enclosure 40 may be employed to encapsulate the second compressible member 30B (or first compressible member 30A). The porous enclosure 40 is configured to be sufficiently porous to allow fluid 20 to enter through and exert pressure on the second (or first) compressible member 30B. The porous enclosure 40 may be rigidly operatively connected to any of the plurality of tank walls 16. The tank 14 can be filled on any grade or at any fill rate without concern that sufficient expansion room may not be left in the tank 14.

As noted above, FIG. 2 illustrates a tank assembly 110, in accordance with a second embodiment. Referring to FIG. 2, the assembly 110 includes at least one compressible member 130 positioned within the interior cavity 18 of the tank 114. The compressible member 130 is configured to provide an expansion space for the fluid 20. In the embodiment shown in FIG. 2, the compressible member 130 is positioned in contact with the first end wall 22 but not the second end wall 24. Any number of compressible members may be employed.

Referring to FIG. 2, a fill channel 132 and a vent channel 134 are each in fluid communication with the interior cavity 18. Referring to FIG. 2, the fill channel 132 and the vent channel 134 each pass through the compressible member 130, via passages 133, 135, respectively. By providing respective fill and vent channels 132, 134 cutting through the compressible member 130 for filling and venting, the tank 114 can be filled on any grade or at any fill rate without concern that sufficient expansion room may not be left in the tank 114.

Referring to FIGS. 1-2, the fill channels 32, 132 may be located at any of the plurality of tank walls 16 and are configured to allow passage of the fluid 20 into the interior cavity 18. Similarly, referring to FIGS. 1-2, the vent channels 34, 134 may be located at any of the plurality of tank walls 16. The vent channels 34, 134 are configured to allow an escape path for the displaced air or vapor (V) that is being pushed out as the fluid 20 is being filled. Additionally, the vent channels 34, 134 are configured to allow escape routes for a vapor (V) out of the interior cavity 18, enabling efficient use of the remaining volume of the tanks 14, 114. The vapor (V) is produced by evaporation of the fluid 20 in certain conditions. The vent channels 32, 132 may include a valve 42 to control the flow of the vapor (V). The valve 42 may be a check valve, a relief valve or any other type of valve known to those skilled in the art.

Referring to FIGS. 1-2, placing compressible members 30, 130 within the tank 14, 114 enables a variable expansion space and removes the necessity of controlling the tank 14, 114 with air space. The compressible members 30, 130 may be positioned in any part of the interior cavity 18. The compressible members 30, 130 eliminate the need to be concerned with the loss of air space when filling the tank 14, 114 with low flow rates and when filling on grades.

Figure 3:
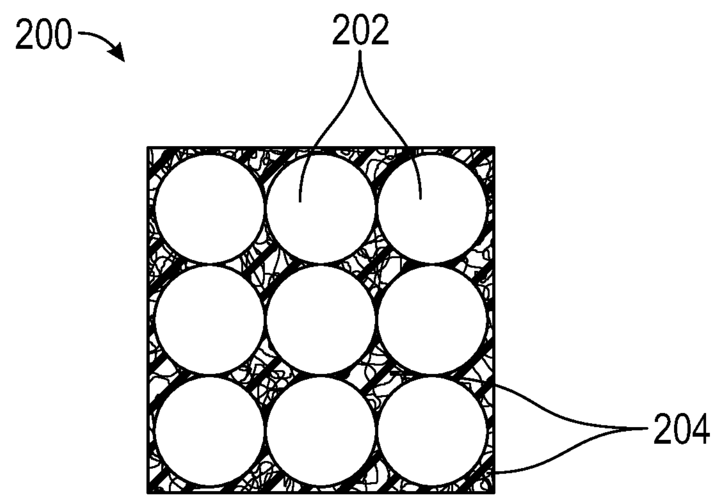
FIG. 3 is an example structure for the compressible member of FIGS. 1-2.

For both the first and second embodiments, the compressible members 30, 130 may be composed of any suitable material known to those skilled in the art. In one example, referring to FIG. 3, the compressible members 30, 130 may be composed of closed cell foam 200. The closed cell foam 200 includes a plurality of discrete gas pockets 202, each completely surrounded by solid material 204. The plurality of discrete gas pockets 202 are sealed from each other such that the fluid 20 may not permeate or flow into the closed cell foam 200.

Figure 4:
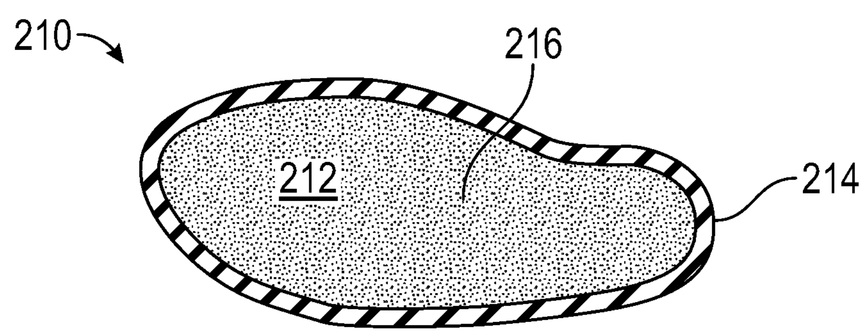
FIG. 4 is another example structure for the compressible member of FIGS. 1-2.

In another example, referring to FIG. 4, the compressible members 30, 130 may each include at least one pouch 210 having a hollow space 212 surrounded by an outer skin 214 (applies to both first and second embodiment). The outer skin 214 is configured to flex in response to pressure exerted by the fluid 20. The outer skin 214 is configured to be impermeable to the fluid 20. The hollow space 212 may be filled with an inert gas 216. Any type of inert gas known to those skilled in the art may be employed. Referring to FIG. 2, the compressible member 130 may include first, second and third pouches 130A, B and C.

Referring now to FIG. 1, the tank assembly 10 may include a controller (C) operatively connected to the tank 14. The controller (C) includes at least one processor P and at least one memory M (or any non-transitory, tangible computer readable storage medium) on which are recorded instructions for executing a method 300, shown in FIG. 5, of controlling the position(s) of each compressible member 30. The memory M can store controller-executable instruction selects, and the processor P can execute the controller-executable instruction selects stored in the memory M. It is to be understood that some blocks may be eliminated.

The controller (C) of FIG. 1 is specifically programmed to execute the blocks of the method 300 and can receive inputs from various sensors connected to the tank 14. Referring to FIG. 1, a sensor 50 may be operatively connected to the tank

14 and configured to obtain a position-sensitive temperature data of the fluid 20. The sensor 50 may include a plurality of probes 52 configured to determine respective temperature gradients along an X, Y and Z axis, respectively. Any temperature sensing method known to those skilled in the art may be employed. For example, each of the plurality of probes 52 may include an array of infra-red thermal detectors.

Referring to FIG. 1, first and second actuators 54, 56 may be operatively connected to and configured to selectively move the first and second compressible members 30A, 30B, respectively. The first and second actuators 54, 56 may include separate sections to facilitate actuation in multiple directions. For example, the first and second actuators 54, 56 may include respective first portions 54A, 56A configured to move in a first direction and respective second portions 54B, 56B configured to move in a second direction. The first and second directions may be perpendicular relative to each other, e.g., parallel to a Y and Z axis, respectively. The first and second actuators 54, 56 may be composed of any type of material, including but not limited to, shape memory alloys composed of nickel and titanium.

Figure 5:
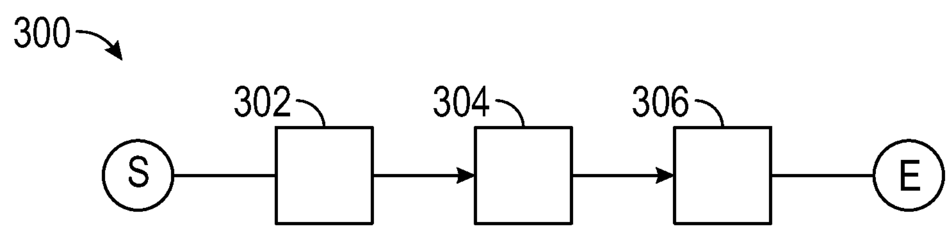
FIG. 5 is a flowchart for a method executable by a controller in the tank assembly of FIG. 1.

Referring now to method 300 of FIG. 5, in block 302, the controller (C) may be programmed to obtain position-sensitive temperature data of the fluid 20, via the sensor 50. In block 304 of FIG. 5, the controller (C) is programmed to determine one or more locations of last freeze of the fluid 20. This determination may be based at least partially on the position-sensitive temperature data from the sensor 50, data from other sensors, by modeling various physical parameters or any other estimation technique known to those skilled in the art.

In block 306, the controller (C) is programmed to position the compressible member 30 (shown in FIG. 1) at the location of last freeze. This provides a technical advantage in that the most efficient use of space for freeze protection is enabled. The location of the last freeze may be selected as the hottest spot in the fluid 20, since local hot spots cool more slowly than the rest of the fluid 20 and freeze last. Referring to FIG. 1, in one example, a first location 60 is determined as the hottest spot in the fluid 20 and a second location 62 is determined as the next or second hottest spot. The controller (C) is programmed to position the first and second compressible members 30A, 30B at the first and second locations 60, 62, respectively, via the first and second actuators 54, 56. Where there are multiple compressible members, the controller (C) may be programmed to determine multiple hot spots; one for each of the compressible members.

The controller (C) of FIG. 1 may be an integral portion of, or a separate module operatively connected to, other controllers of the assembly 10. The controller 20 (of FIG. 1) includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a selection of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A tank assembly comprising:

a tank having a plurality of tank walls surrounding an interior cavity;

wherein the interior cavity is configured to store a fluid, the fluid being configured to expand upon a change in temperature;

a fill channel and a vent channel each in fluid communication with the interior cavity;

at least one compressible member positioned within the interior cavity and configured to provide an expansion space for the fluid;

a first blocking member positioned in the interior cavity and operatively connected to the fill channel;

a second blocking member positioned in the interior cavity and operatively connected to the vent channel; and wherein the first and second blocking members are configured to prevent the at least one compressible member from exiting the interior cavity.

2. The assembly of claim 1, wherein the at least one compressible member is composed of a closed cell foam material.

3. The assembly of claim 1:

wherein the at least one compressible member includes a pouch having a hollow space surrounded by an outer skin;

wherein the hollow space is filled with an inert gas; and wherein the outer skin is flexible and substantially impermeable by the fluid.

4. The assembly of claim 1, wherein:

the tank includes a first end wall, a second end wall spaced from the first end wall and a plurality of sidewalls;

the plurality of sidewalls are each contiguous with the first end wall and the second end wall; and wherein the at least one compressible member is positioned in contact with the first end wall but not the second end wall.

5. The assembly of claim 4, wherein:

the fill channel and the vent channel each passes through the at least one compressible member;

the fill channel is configured to allow passage of the fluid into the interior cavity; and the vent channel is configured to allow passage of a vapor out of the interior cavity.

6. The assembly of claim 1, further comprising:

a porous enclosure rigidly operatively connected to at least one of the plurality of tank walls; and wherein the porous enclosure encapsulates the at least one compressible member.

7. The assembly of claim 1, further comprising:

a sensor operatively connected to the tank and configured to obtain a position-sensitive temperature data of the fluid;

an actuator operatively connected to and configured to selectively move the at least one compressible member; and a controller operatively connected to and configured to control the actuator.

8. The assembly of claim 7, wherein the sensor includes:

a plurality of probes configured to determine respective temperature gradients along an X, Y and Z axis, respectively.

9. The assembly of claim 7, wherein:

the controller has a processor and tangible, non-transitory memory on which is recorded instructions for executing a method of controlling a position of the at least one compressible member, execution of the instructions by the processor causing the controller to:

obtain the position-sensitive temperature data of the fluid, via the sensor;

determine a location of last freeze of the fluid, based at least partially on the position-sensitive temperature data; and position the at least one compressible member at the location of the last freeze, via the actuator.

10. A tank assembly comprising:

a tank having a plurality of tank walls surrounding an interior cavity;

wherein the interior cavity is configured to store a fluid, the fluid being configured to expand upon a change in temperature;

a fill channel and a vent channel each in fluid communication with the interior cavity;

first and second compressible members positioned within the interior cavity and configured to provide an expansion space for the fluid;

a sensor operatively connected to the tank and configured to obtain a position-sensitive temperature data of the fluid;

first and second actuators operatively connected to and configured to selectively move the first and second compressible members, respectively; and a controller operatively connected and configured to control the first actuator and the second actuator.

11. The assembly of claim 10, wherein the sensor includes:

a plurality of probes configured to determine respective temperature gradients along an X, Y and Z axis, respectively.

12. The assembly of claim 10, wherein:

the controller has a processor and tangible, non-transitory memory on which is recorded instructions for executing a method of controlling respective positions of the first and second compressible members, execution of the instructions by the processor causing the controller to:

obtain the position-sensitive temperature data of the fluid, via the sensor;

determine first and second locations of last freeze of the fluid based at least partially on the position-sensitive temperature data; and position the first and second compressible member at the first and second locations, respectively, via the first and second actuators.

13. A tank assembly comprising:

a tank having a plurality of tank walls surrounding an interior cavity;

wherein the interior cavity is configured to store a fluid, the fluid being configured to expand upon a change in temperature;

a fill channel and a vent channel each in fluid communication with the interior cavity;

at least one compressible member positioned within the interior cavity and configured to provide an expansion space for the fluid;

a porous enclosure rigidly operatively connected to at least one of the plurality of tank walls; and wherein the porous enclosure encapsulates the at least one compressible member.

14. The assembly of claim 13, wherein the at least one compressible member is composed of a closed cell foam material.

15. The assembly of claim 13:

wherein the at least one compressible member includes a pouch having a hollow space surrounded by an outer skin;

wherein the hollow space is filled with an inert gas; and wherein the outer skin is flexible and substantially impermeable by the fluid.

16. The assembly of claim 13, wherein:

the tank includes a first end wall, a second end wall spaced from the first end wall and a plurality of sidewalls;

the plurality of sidewalls are each contiguous with the first end wall and the second end wall; and wherein the at least one compressible member is positioned in contact with the first end wall but not the second end wall.

17. The assembly of claim 13, wherein:

the fill channel and the vent channel each passes through the at least one compressible member;

the fill channel is configured to allow passage of the fluid into the interior cavity; and the vent channel is configured to allow passage of a vapor out of the interior cavity.

18. The assembly of claim 13, further comprising:

a sensor operatively connected to the tank and configured to obtain a position-sensitive temperature data of the fluid;

an actuator operatively connected to and configured to selectively move the at least one compressible member; and a controller operatively connected to and configured to control the actuator.

19. The assembly of claim 18, wherein the sensor includes:

a plurality of probes configured to determine respective temperature gradients along an X, Y and Z axis, respectively.

20. The assembly of claim 18, wherein:

the controller has a processor and tangible, non-transitory memory on which is recorded instructions for executing a method of controlling a position of the at least one compressible member, execution of the instructions by the processor causing the controller to:

obtain the position-sensitive temperature data of the fluid, via the sensor;

determine a location of last freeze of the fluid, based at least partially on the position-sensitive temperature data; and position the at least one compressible member at the location of the last freeze, via the actuator.

* * * * *